United States Patent
Iwasaki et al.

(10) Patent No.: US 10,247,903 B2
(45) Date of Patent: Apr. 2, 2019

(54) LENS BARREL AND IMAGING DEVICE

(71) Applicant: Panasonic Intellectual Property Management Co., Ltd., Osaka (JP)

(72) Inventors: Keishi Iwasaki, Osaka (JP); Tetsuya Uno, Osaka (JP); Takumi Kuwahara, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/451,613

(22) Filed: Mar. 7, 2017

(65) Prior Publication Data

US 2017/0176711 A1  Jun. 22, 2017

Related U.S. Application Data

(63) Continuation of application No. PCT/JP2015/004335, filed on Aug. 28, 2015.

(30) Foreign Application Priority Data

Sep. 12, 2014 (JP) ................... 2014-186693

(51) Int. Cl.

| G02B 7/02 | (2006.01) |
|---|---|
| G02B 7/09 | (2006.01) |
| G03B 11/00 | (2006.01) |
| G03B 17/04 | (2006.01) |
| G02B 5/00 | (2006.01) |
| G02B 7/08 | (2006.01) |
| G03B 11/04 | (2006.01) |

(Continued)

(52) U.S. Cl.
CPC ............... *G02B 7/09* (2013.01); *G02B 5/005* (2013.01); *G02B 7/021* (2013.01); *G02B 7/08* (2013.01); *G03B 11/00* (2013.01); *G03B 11/045* (2013.01); *G03B 17/04* (2013.01); *H04N 5/2254* (2013.01); *G02B 5/208* (2013.01)

(58) Field of Classification Search
CPC .......... G02B 7/09; G02B 5/005; G02B 7/021; G02B 27/0075; G02B 27/0081; G02B 27/0018; G02B 27/58; G03F 7/70091
See application file for complete search history.

(56) References Cited

U.S. PATENT DOCUMENTS

| 2003/0016454 A1 | 1/2003 | Yamaguchi et al. |
|---|---|---|
| 2013/0121681 A1* | 5/2013 | Lee .......................... G03B 9/02 396/508 |
| 2015/0185366 A1* | 7/2015 | Bone ...................... G02B 5/003 359/580 |

FOREIGN PATENT DOCUMENTS

| JP | 60-211442 A | 10/1985 |
|---|---|---|
| JP | 05-011304 A | 1/1993 |
| JP | 2003-035855 A | 2/2003 |

(Continued)

OTHER PUBLICATIONS

International Search Report for corresponding International Application No. PCT/JP2015/004335 dated Oct. 27, 2015.

*Primary Examiner* — Alicia M Harrington
(74) *Attorney, Agent, or Firm* — Renner Otto Boisselle & Sklar, LLP

(57) ABSTRACT

The lens barrel includes an imaging optical system comprising at least a first lens, a plate-shaped protection glass which is disposed closer to a subject side than the first lens and has light transmission, and an annular ring part provided on the outer circumferential edge of the surface of the protection glass facing the subject side.

10 Claims, 11 Drawing Sheets

(51) Int. Cl.
*H04N 5/225* (2006.01)
*G02B 5/20* (2006.01)

(56) References Cited

FOREIGN PATENT DOCUMENTS

| | | |
|---|---|---|
| JP | 2009-049589 A | 3/2009 |
| JP | 2010-026026 A | 2/2010 |
| JP | 2014-115335 A | 6/2014 |

* cited by examiner

LENS BARREL AND IMAGING DEVICE

BACKGROUND

1. Technical Field

The technology disclosed herein relates to a lens barrel and an imaging device.

2. Description of Related Art

Conventionally, there has been known a configuration, in a lens barrel having at least one lens, in which a protection member is provided closer to a subject side than a lens closest to the subject side.

For example, in a lens barrel disclosed in Unexamined Japanese Patent Publication No. H05-11304, a flat plate protection glass having light transmission is provided on a position closer to a subject side than a lens closest to the subject side.

Meanwhile, in the configuration in which a protection member is provided at the most anterior part of a lens barrel as in the lens barrel disclosed in Unexamined Japanese Patent Publication No. H05-11304, the protection member is susceptible to impact, and therefore, the protection member might be broken.

SUMMARY

The lens barrel and the imaging device disclosed herein includes an optical system comprising at least one lens, a plate-shaped protection member which is disposed closer to a subject side than the lens and has light transmission, and an annular protection ring provided on an outer circumferential edge of the surface of the protection member facing the subject side.

According to this configuration, a lens barrel and an imaging device, in which the protection member is prevented from being broken, can be provided.

DETAILED DESCRIPTION

Hereinafter, an exemplary embodiment will be described in detail with reference to the drawings.

Figure 1:
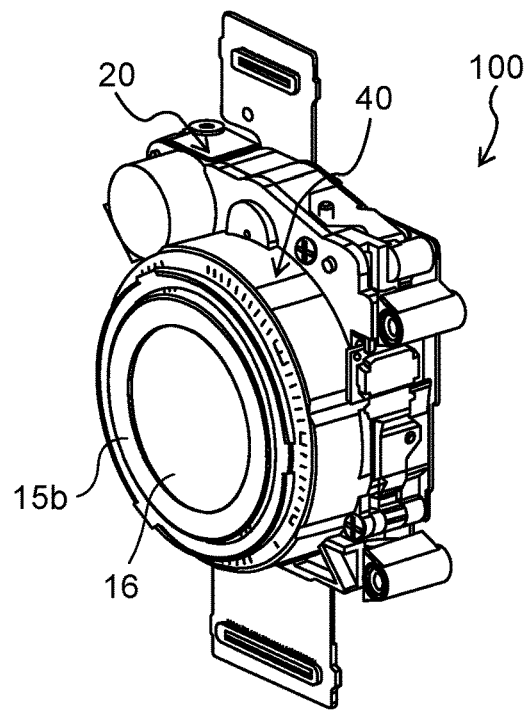
FIG. 1 is a perspective view of a lens barrel in a retracted position.
Figure 2:
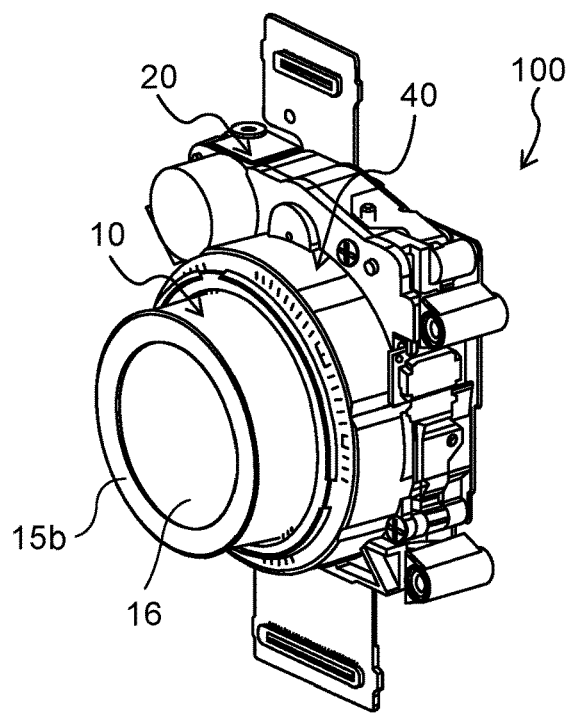
FIG. 2 is a perspective view of a lens barrel in a photographing position.
Figure 3:
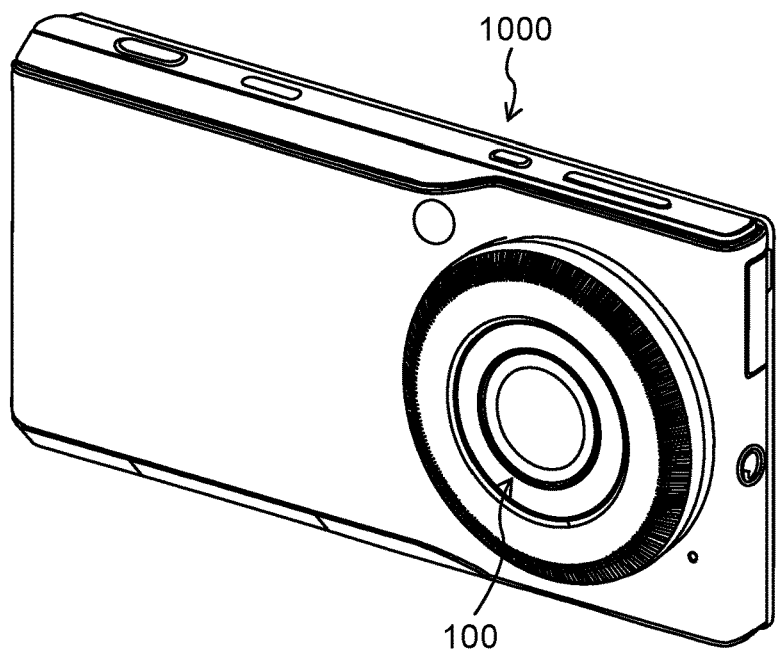
FIG. 3 is a perspective view of a digital camera in which the lens barrel is in the retracted position.
Figure 4:
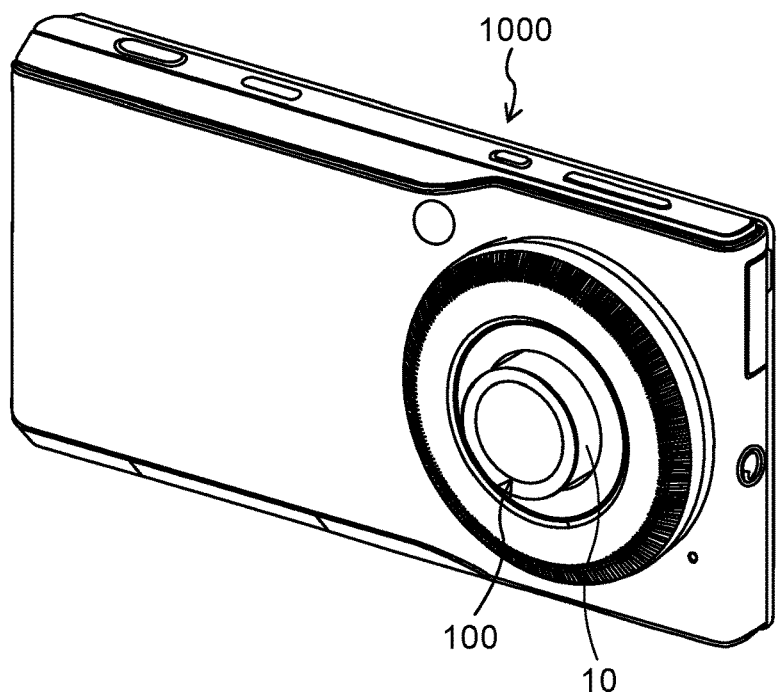
FIG. 4 is a perspective view of the digital camera in which the lens barrel is in the photographing position.

Digital camera 1000 including lens barrel 100 will be described below as an example. FIG. 1 is a perspective view of lens barrel 100 in a retracted position. FIG. 2 is a perspective view of lens barrel 100 in a photographing position. FIG. 3 is a perspective view of digital camera 1000 in which lens barrel 100 is in the retracted position. FIG. 4 is a perspective view of digital camera 1000 in which lens barrel 100 is in the photographing position.

Lens barrel 100 is mounted to digital camera 1000. Lens barrel 100 is installed on the surface of digital camera 1000 opposite to a display. Lens barrel 100 is collapsible, and configured such that a lens frame is extended in the photographing position. Digital camera 1000 has a photographing function, and captures an image using lens barrel 100. Digital camera 1000 is an example of an imaging device, and the part of digital camera 1000 excluding lens barrel 100 is an example of a camera main body.

Figure 5:
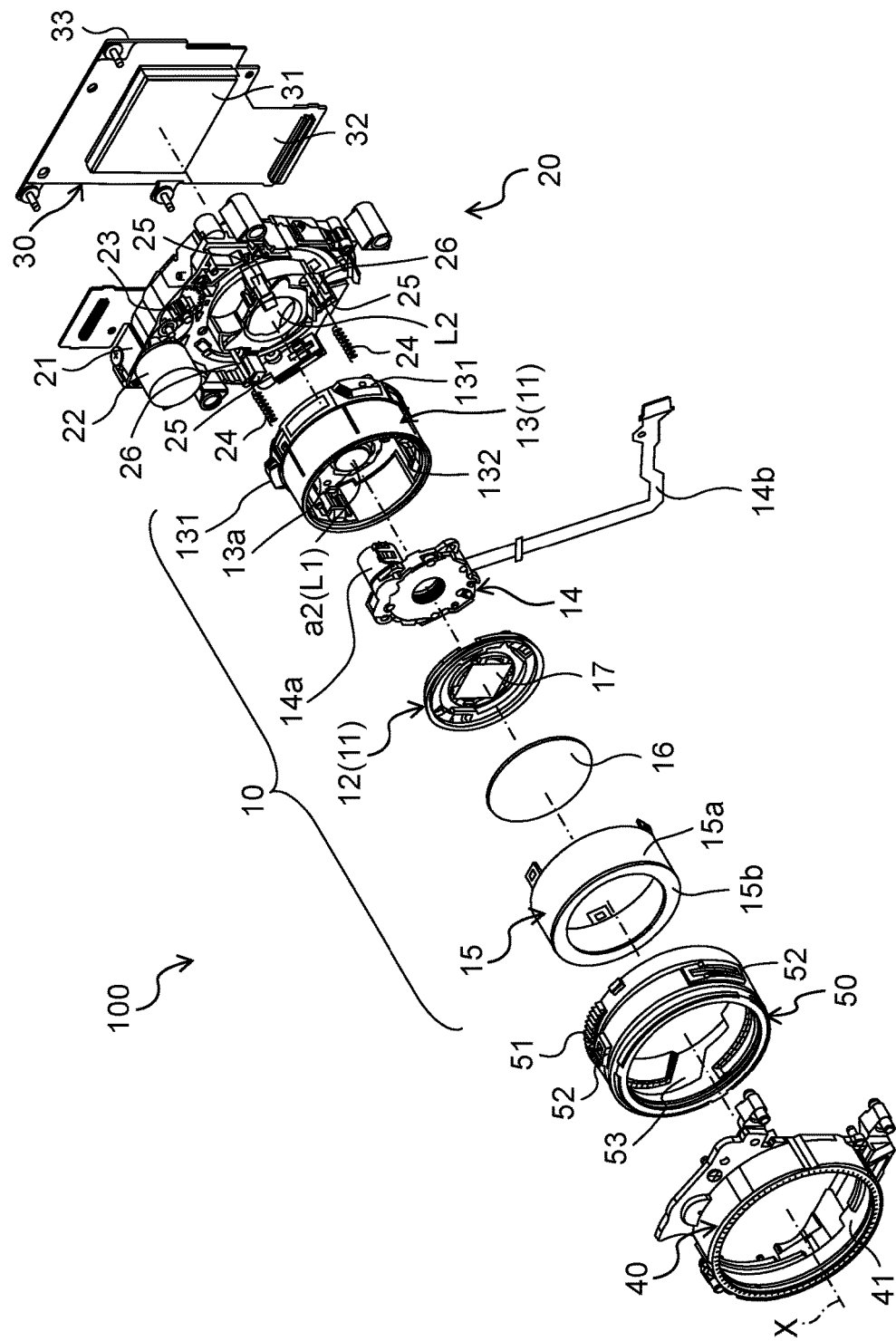
FIG. 5 is an exploded perspective view of the lens barrel.

FIG. 5 is an exploded perspective view of lens barrel 100.

Lens barrel 100 includes: first unit 10 that holds first lens unit L1; second unit 20 that holds second lens unit L2; an imaging element unit 30 that includes CMOS image sensor 31; a fixed frame 40; and drive frame 50 that holds first unit 10 so as to be slidable. First lens unit L1 and second lens unit L2 constitute an imaging optical system. Hereinafter, a subject side may also be referred to as a "front side", and an imaging element side may also be referred to as a "rear side", in an optical axis direction of the imaging optical system. An "inner circumferential surface" of a substantially cylindrical member is defined as a surrounding surface, around optical axis, which faces optical axis. An "outer circumferential surface" of a substantially cylindrical member is defined as a surrounding surface, around optical axis, opposite to optical axis.

Figure 6:
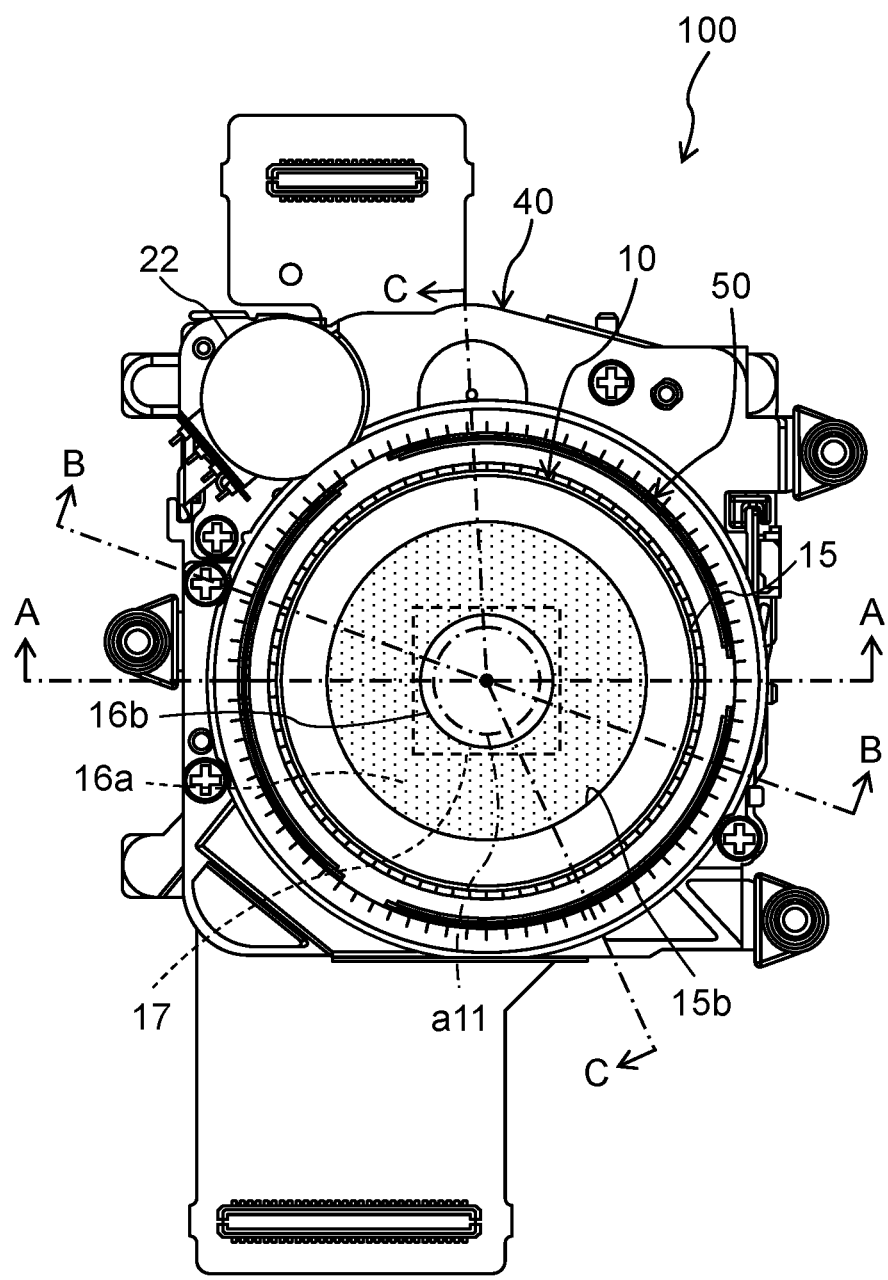
FIG. 6 is front view of the lens barrel.
Figure 7:
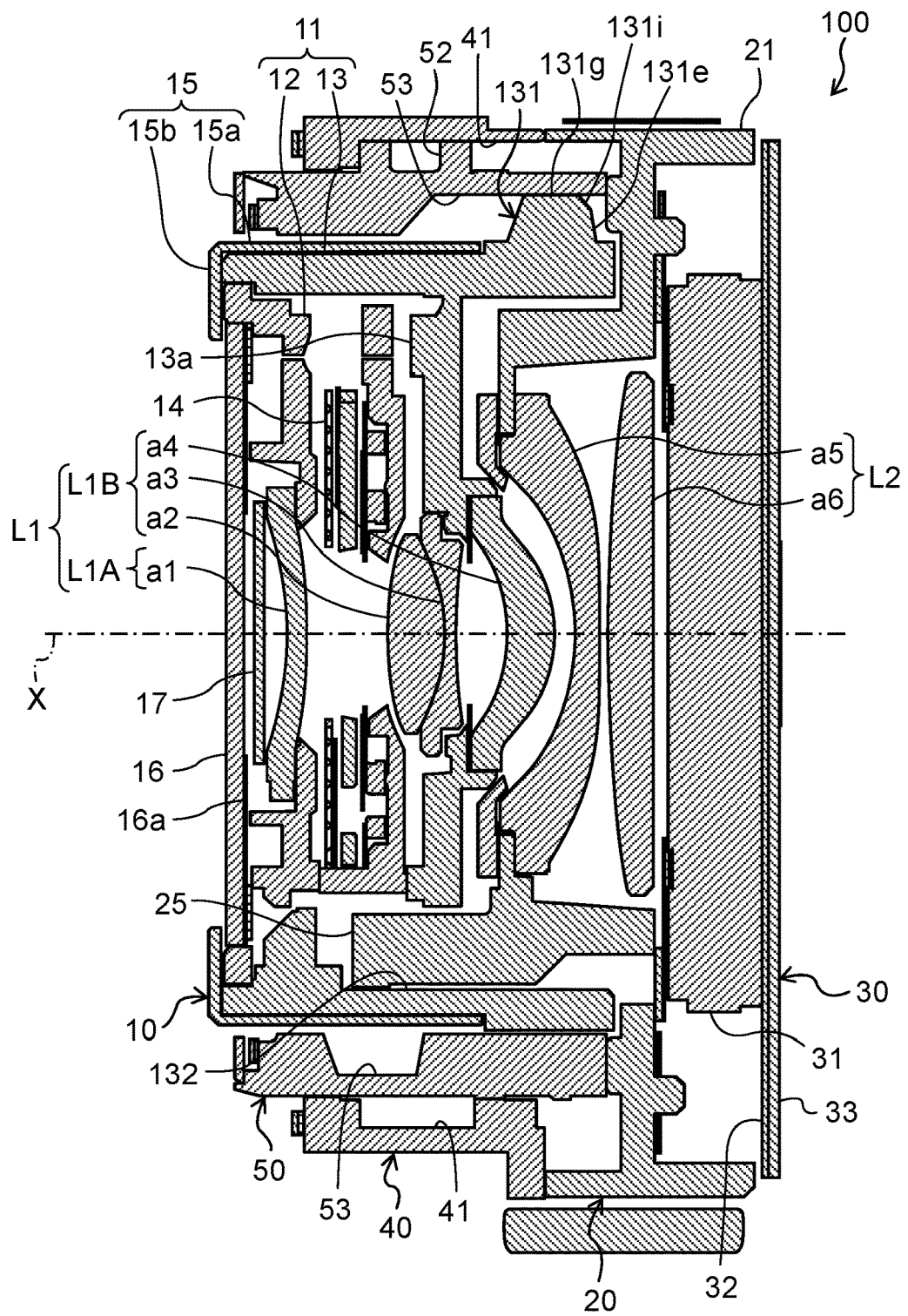
FIG. 7 is a sectional view of the lens barrel in the retracted position taken along line A-A in FIG. 6.
Figure 8:
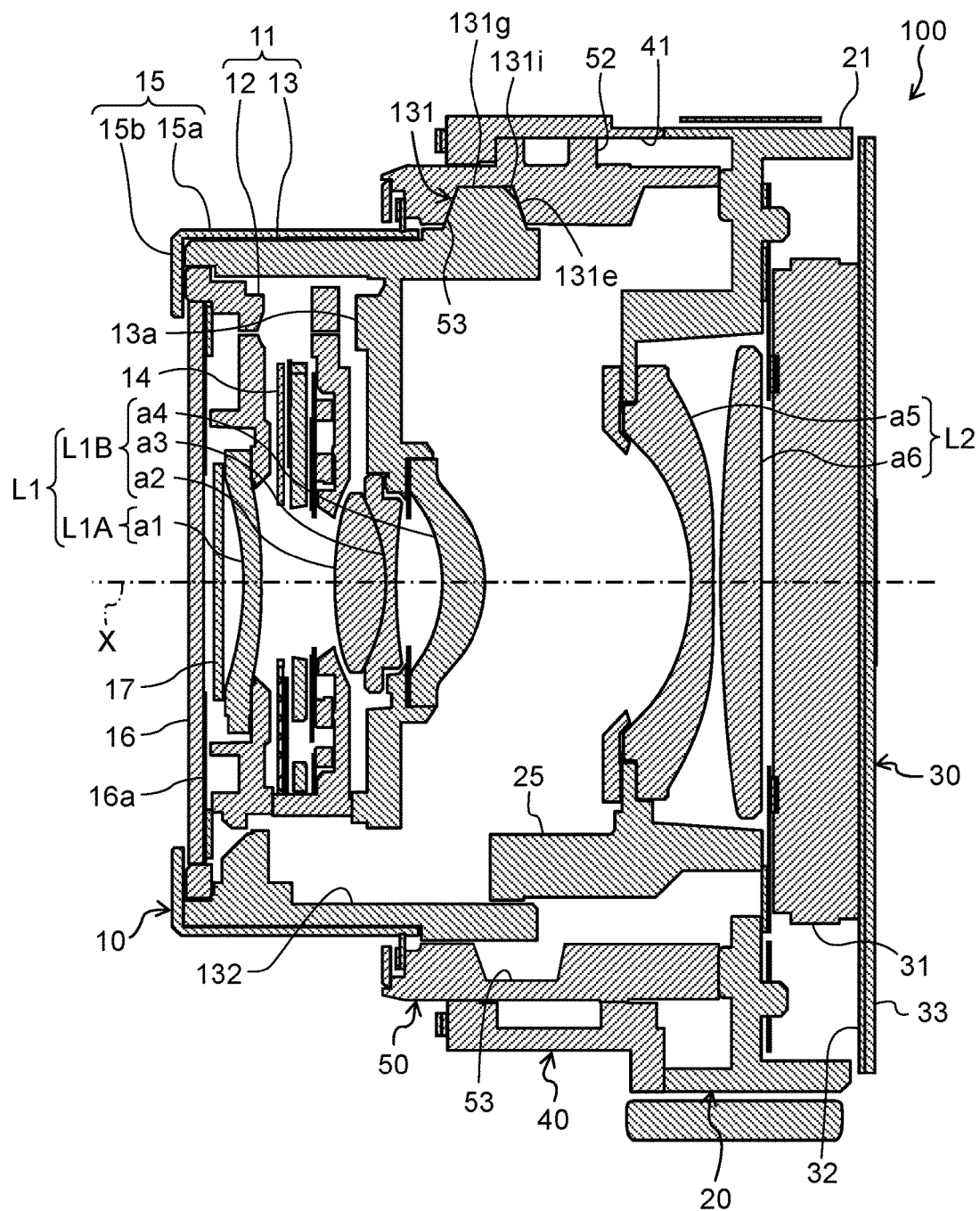
FIG. 8 is a sectional view of the lens barrel in the photographing position taken along line A-A in FIG. 6.

FIG. 6 is a front view of lens barrel 100. FIG. 7 is a sectional view of lens barrel 100 in the retracted position taken along line A-A in FIG. 6. FIG. 8 is a sectional view of lens barrel 100 in the photographing position taken along line A-A in FIG. 6.

First unit 10 includes first lens unit L1, first unit frame 11 that holds first lens unit L1, shutter/diaphragm unit 14, decorative ring 15, protection glass 16, and optical filter 17.

First lens unit L1 includes first lens a1, second lens a2, third lens a3, and fourth lens a4. First lens a1, second lens a2, third lens a3, and fourth lens a4 are arranged on optical axis X in this order from the subject side. First lens a1 composes first front-side lens unit L1A anterior to shutter/diaphragm unit 14. Second lens a2 to fourth lens a4 compose first rear-side lens unit L1B posterior to shutter/diaphragm unit 14. First lens unit L1 functions as a focusing lens in the imaging optical system.

First unit frame 11 has a split structure including first front frame 12 and first rear frame 13. First front frame 12 is a substantially disc-shaped member, and has an opening on the center. First front frame 12 holds first front-side lens unit L1A, that is, first lens a1. First rear frame 13 is a substantially cylindrical member, and holds first rear-side lens unit L1B, that is, second to fourth lenses a2 to a4. Flat plate-shaped holding section 13a that holds second to fourth lenses a2 to a4 is provided on the inner circumference side of first rear frame 13. Holding section 13a is not connected throughout the entire circumference of first rear frame 13, but connected to a portion of the inner circumference of first rear frame 13.

In addition, first front frame 12 holds protection glass 16 and optical filter 17. Optical filter 17 is an IR cur filter that cuts infrared light from incident light. Protection glass 16 is a reinforced glass for protecting first lens unit L1. Protection glass 16, optical filter 17, and first lens a1 are arranged on optical axis X in this order from the subject side. First front frame 12 is attached to the front end of first rear frame 13.

Shutter/diaphragm unit 14 has the configuration in which a shutter mechanism and a diaphragm mechanism are integrally formed. Shutter/diaphragm unit 14 includes motor 14a that drives the diaphragm mechanism, a motor (not illustrated) that drives a shutter, and flexible printed circuit board 14b that is connected to these motors. Shutter/diaphragm unit 14 is provided on the inner circumferential side of first rear frame 13, and held between holding section 13a and first front frame 12. Holding section 13a has formed thereon openings 13b, 13c through which motor 14a and flexible printed circuit board 14b pass as illustrated in later-described FIG. 13. That is, motor 14a extends rearward from holding section 13a through opening 13b. In addition, flexible printed circuit board 14b extends rearward from holding section 13a through opening 13c.

Decorative ring 15 is a substantially cylindrical member made of a metal. Decorative ring 15 has cylindrical part 15a and ring part 15b which is formed integrally with the front end of cylindrical part 15a. Ring part 15b is a toric flat plate of which normal line is oriented in the optical axis direction. Ring part 15b is provided inside of the front end of cylindrical part 15a in the radial direction. Cylindrical part 15a is an example of a cylinder part and ring part 15b is an example of a protection ring. Decorative ring 15 is attached to first unit frame 11 from front. Cylindrical part 15a is fitted to an outer circumferential surface of first unit frame 11.

Second unit 20 includes second lens unit L2, second unit frame 21 that holds second lens unit L2, focusing motor 22 that drives drive frame 50, gear train 23 (see FIG. 5) that is connected to the drive shaft of focusing motor 22, and two bias springs 24 (see FIG. 5) that bias first unit 10 forward.

Second lens unit L2 includes fifth lens a5 and sixth lens a6. Fifth lens a5 and sixth lens a6 are arranged on optical axis X in this order from the subject side.

Gear train 23 includes a plurality of gears. A gear in gear train 23 is meshed with a gear provided to the drive shaft of focusing motor 22, and another gear is meshed with a later-described drive gear of drive frame 50. In this way, gear train 23 transmits the driving force of focusing motor 22 to drive frame 50.

Bias springs 24 are coil springs, and bias first unit 10 forward to prevent rattling of first unit 10. This will be described later in detail.

Imaging element unit 30 includes CMOS image sensor 31 serving as an imaging element, flexible printed circuit board 32 connected to CMOS image sensor 31, and base plate 33 having CMOS image sensor 31 and flexible printed circuit board 32 mounted thereon. Base plate 33 is attached to second unit frame 21 from rear. Thus, CMOS image sensor 31 is disposed on optical axis X on the rear of second lens unit L2.

Fixed frame 40 is a substantially cylindrical member, and attached to second unit frame 21 from front. Fixed frame 40 contains drive frame 50 and first unit 10.

Drive frame 50 is a substantially cylindrical member, and contained in fixed frame 40. Drive gear 51 is mounted on the outer circumferential surface of drive frame 50. Drive gear 51 has a plurality of gear teeth arranged in the circumferential direction. Drive gear 51 is meshed with gear train 23 on second unit 20. That is, drive frame 50 is rotationally driven by focusing motor 22. Drive frame 50, as described in detail later, is engaged with first unit 10. Drive frame 50 drives first unit 10 by being rotationally driven by focusing motor 22.

Next, the engagement relation of the respective frames will be described.

Fixed frame 40 has bayonet groove 41 that is formed on the inner circumferential surface of fixed frame 40 and is extending in the circumferential direction. On the other hand, three bayonet claws 52 are provided on the outer circumferential surface of drive frame 50. Drive frame 50 is contained in fixed frame 40 with bayonet claws 52 being engaged with bayonet groove 41. Specifically, drive frame 50 is rotatably held relative to fixed frame 40 in the state of being restricted in the movement in the optical axis direction.

Note that three entry grooves extend from bayonet groove 41 toward the rear end of fixed frame 40. The sizes and circumferential positions of three entry grooves correspond to the sizes and circumferential positions of three bayonet claws 52. That is, when drive frame 50 is assembled to fixed frame 40, bayonet claws 52 are inserted into bayonet groove 41 through entry grooves. FIGS. 7 and 8 illustrate, on the upper part thereof, the entry groove of bayonet groove 41, wherein bayonet claws 52 are located on the position same as the position where the entry grooves are formed in the circumferential direction.

Figure 13:
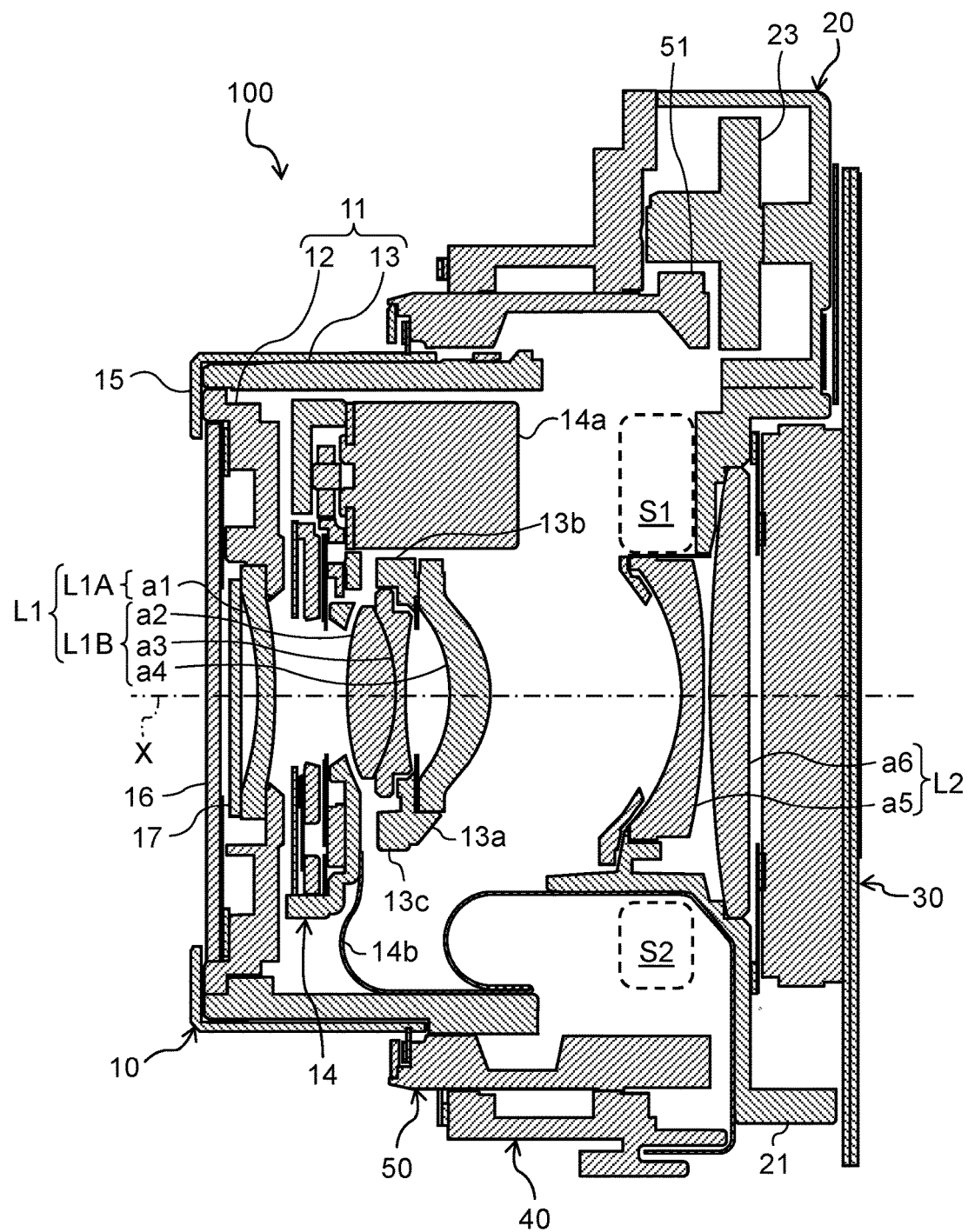
FIG. 13 is a sectional view of the lens barrel in the photographing position taken along line C-C in FIG. 6.
Figure 14:
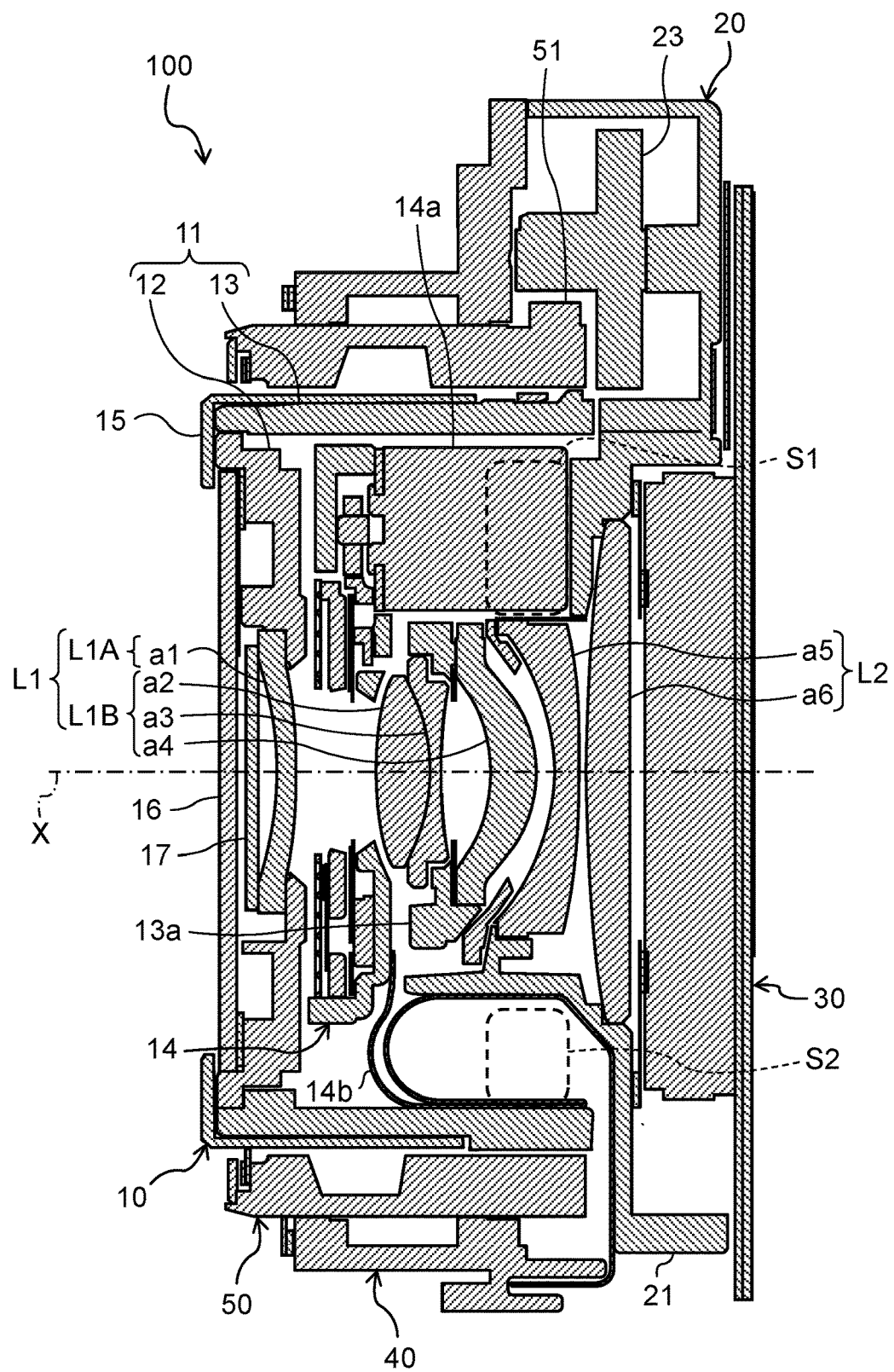
FIG. 14 is a sectional view of the lens barrel in the retracted position taken along line C-C in FIG. 6.

As illustrated in later-described FIGS. 13 and 14, drive gear 51 is provided on the rear end of drive frame 50, and projects rearward from the rear end of fixed frame 40 in the state in which drive frame 50 is contained in fixed frame 40. Specifically, drive gear 51 is exposed outwardly from fixed frame 40 to be capable of being meshed with gear train 23.

Thus, when being driven by focusing motor 22, drive frame 50 rotates about the optical axis without moving along the optical axis direction.

In addition, three cam grooves 53 are formed on the inner circumferential surface of drive frame 50. Although described in detail later, each cam groove 53 has a shape by which first unit 10 is moved along the optical axis direction when drive frame 50 rotates. On the other hand, three cam pins 131 are provided on the outer circumferential surface of first rear frame 13 of first unit 10. First unit 10 is contained in drive frame 50 with cam pins 131 being engaged with cam grooves 53.

In addition, three rectilinear grooves 132 are formed on the inner circumferential surface of first rear frame 13. Rectilinear grooves 132 linearly extend forward in the optical axis direction from the rear end of first rear frame 13. On the other hand, three rectilinear guides 25 are formed on second unit frame 21. Rectilinear guides 25 linearly extend forward in the optical axis direction from second unit frame 21. The sizes and circumferential positions of three rectilinear guides 25 correspond to the sizes and circumferential positions of three rectilinear grooves 132. That is, rectilinear guides 25 are engaged with rectilinear grooves 132.

In this manner, first unit 10 is held to be unable to rotate about the optical axis and able to move straight in the optical axis direction due to the engagement between rectilinear grooves 132 and rectilinear guides 25, while cam pins 131 are engaged with cam grooves 53 on drive frame 50. According to this configuration, when drive frame 50 rotates, first unit 10 moves forward and backward along the optical axis direction according to the shape of cam grooves 53 without rotating.

Thus, when focusing motor 22 is activated, drive frame 50 rotates, and first unit 10 moves forward and backward along the optical axis direction due to the rotation of drive frame 50. While in the retracted position, first unit 10 is closest to second unit 20, so that most of first unit 10 is contained in fixed frame 40. In the photographing position, first unit 10 is extended from fixed frame 40. First unit 10 further moves in the optical axis direction from the extended position to adjust the position of first lens unit L1 in the optical axis direction. Thus, the focal point of the imaging optical system is adjusted.

<Cam Mechanism>

Next, the cam mechanism between first unit 10 and drive frame 50 will be described in detail.

Figure 9:
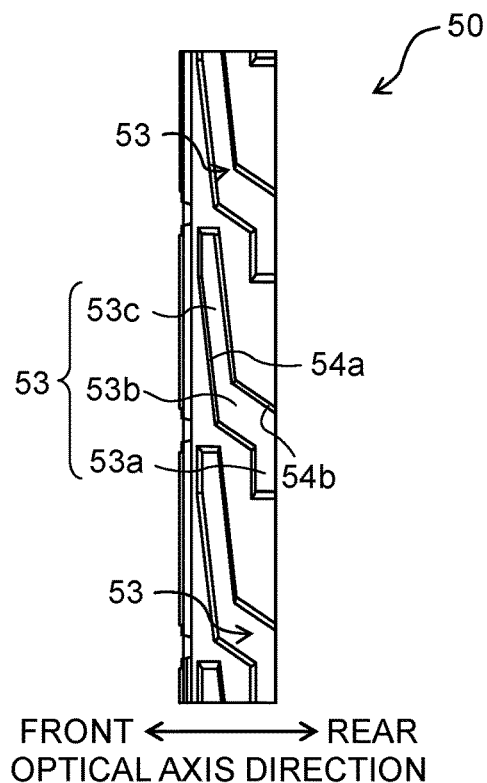
FIG. 9 is a development diagram of an inner circumferential surface of a drive frame.

FIG. 9 is a development diagram of the inner circumferential surface of drive frame 50.

Cam grooves 53 are opened on the rear end of drive frame 50, and extend from the rear end. Each of cam grooves 53 has first region 53a, second region 53b, and third region 53c. First region 53a extends in the circumferential direction on the rear end of drive frame 50. Second region 53b is continuous with first region 53a, and obliquely extends forward while tilting with respect to the circumferential direction. Third region 53c is continuous with second region 53b, and obliquely extends forward while tilting with respect to the circumferential direction at a tilt angle smaller than that of second region 53b.

First region 53a is a region where cam pin 131 is located when lens barrel 100 is in the retracted position. Note that first region 53a is opened on the rear end of drive frame 50. When first unit 10 is incorporated into drive frame 50, cam pin 131 is firstly inserted into first region 53a of cam groove 53.

When lens barrel 100 is transferred from the retracted position to the photographing position, cam pin 131 moves to the end of third region 53c close to second region 53b by passing through first region 53a and second region 53b. That is, second region 53b is a region where cam pin 131 passes when lens barrel 100 is transferred from the retracted position to the photographing position.

Third region 53c is a region where cam pin 131 moves in the photographing position. Due to the movement of cam pin 131 in third region 53c, the position of first lens unit L1 in the optical axis direction is adjusted, so that the focal point of the imaging optical system is adjusted.

In the present embodiment, a pair of side faces of cam groove 53 is not parallel to each other, but is tilted so that the width thereof is decreased toward a bottom surface. In other words, cam groove 53 has a tapered shape. The side face on the front in the optical axis direction in the pair of side faces is defined as first side face 54a, and the side face on the rear in the optical axis direction is defined as second side face 54b.

Figure 10:
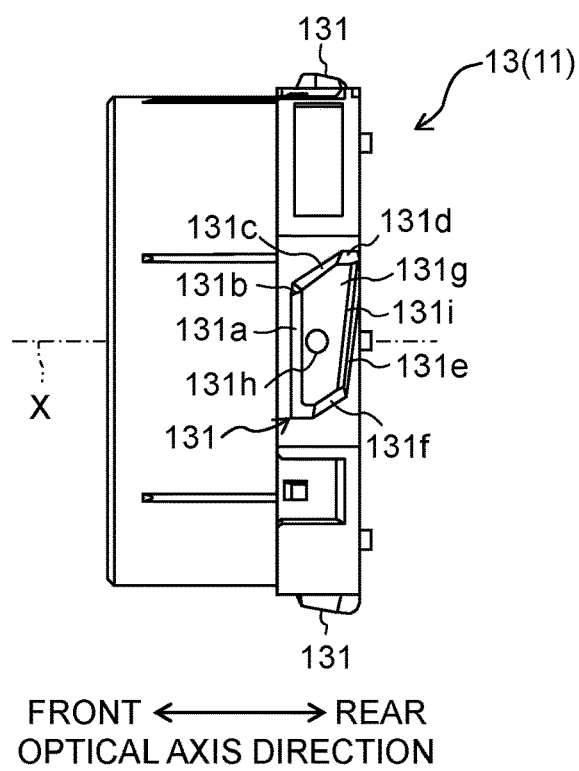
FIG. 10 is a side view of a main frame.

FIG. 10 is a side face of first rear frame 13. Each cam pin 131 is formed into a shape of a substantially truncated pyramid. Cam pin 131 has six side faces and vertex surface 131g. Six side faces are all tilted with respect to the radial direction. Specifically, cam pin 131 has a tapered shape according to cam groove 53, and side faces of cam pin 131 slide on the side faces of cam groove 53. The foremost side face in the optical axis direction which extends in the circumferential direction is defined as first side face 131a, and the remaining side faces are defined as second to sixth side faces 131b to 131f in the clockwise direction in FIG. 10. Note that protrusion 131h having a substantially spherical crown is formed on vertex surface 131g of cam pin 131. Protrusion 131h slides on the bottom surface of cam groove 53 when cam pin 131 moves in cam groove 53. That is, due to protrusion 131h, the sliding area between cam pin 131 and cam groove 53 is decreased, so that sliding resistance can be reduced.

First side face 131a faces substantially forward. The end of first side face 131a close to sixth side face 131f is curved toward sixth side face 131f. First side face 131a is in sliding contact with first side face 54a of first region 53a, when cam pin 131 moves in first region 53a of cam groove 53.

Fourth side face 131d faces substantially in the circumferential direction, and almost parallel to optical axis X. When first unit 10 is in the retracted position, fourth side face 131d is located to face the end face of first region 53a opposite to second region 53b.

When cam pin 131 moves to the end of first region 53a close to second region 53b, sixth side face 131f is in contact with second side face 54b of second region 53b. Sixth side face 131f is tilted with respect to the circumferential direction at the tilt angle same as that of second region 53b. In addition, third side face 131c is tilted with respect to the circumferential direction at the tilt angle same as that of second region 53b. Third side face 131c is in contact with first side face 54a of second region 53b. When cam pin 131 moves in second region 53b, third side face 131c and sixth side face 131f respectively slide on first and second side faces 54a, 54b of second region 53b.

After cam pin 131 moves to the end of second region 53b close to third region 53c, second side face 131b is in contact with first side face 54a of third region 53c. Second side face 131b is tilted with respect to the circumferential direction at the tilt angle same as that of third region 53c. In addition, fifth side face 131e is tilted with respect to the circumferential direction at the tilt angle same as that of third region 53c. Fifth side face 131e is in contact with second side face 54b of third region 53c. When cam pin 131 moves in third region 53c, second side face 131b and fifth side face 131e respectively slide on first and second side faces 54a, 54b of third region 53c. Note that first side face 54a is bent and extends in the circumferential direction on the end of third region 53c opposite to second region 53b. In other words, on this end, first side face 131a and second side face 131b of cam pin 131 are in contact with first side face 54a of third region 53c.

Note that, since first region 53a is not provided with second side face 54b, cam pin 131 may only have two side faces which slide on second side face 54b.

As described above, cam groove 53 is bent on two locations, and has three regions with different tilt angles in the circumferential direction. Therefore, cam pin 131 needs to have side faces sliding on first to third regions 53a to 53c. Here, since second side face 54b of cam groove 53 is not formed on first region 53a, it is only necessary that cam pin 131 has two side faces, that is, fifth side face 131e and sixth side face 131f, which slide on second side face 54b. On the other hand, since first side face 54a is formed on first to third regions 53a to 53c, cam pin 131 needs to have three side faces, that is, first to third side faces 131a to 131c, which slide on first side face 54a. The tilt angles of cam groove 53 relative to the circumferential direction satisfies the relation of first region 53a <third region 53c <second region 53b, and therefore, second side face 131b is located between first side face 131a and third side face 131c.

More specifically, if first region 53a and third region 53c are parallel to each other, first side face 131a of cam pin 131 slides on both first side face 54a of first region 53a and first side face 54a of third region 53c, so that second side face 131b is unnecessary. If the tilt angle of third region 53c is smaller than that of first region 53a (for example, if third region 53c is tilted obliquely rearward), a side face which slides on first side face 54a of third region 53c needs to be formed on the end of first side face 131a opposite to third side face 131c of cam pin 131. In contrast, if the tilt angle of third region 53c is smaller than that of second region 53b and larger than that of first region 53a, a side face which slides on first side face 54a of third region 53c needs to be formed between first side face 131a sliding on first side face 54a of third region 53c and third side face 131c sliding on first side face 54a of second region 53b. As a result, second side face 131b is located between first side face 131a and third side face 131c.

In such a configuration, when cam pin 131 slides on first region 53a, first side face 131a slides on first side face 54a of cam groove 53. When cam pin 131 slides on second region 53b, third side face 131c slides on first side face 54a of cam groove 53. Therefore, it is preferable that, when cam pin 131 passes through the boundary between first region 53a and second region 53b, the region of cam pin 131 sliding on first side face 54a of cam groove 53 is switched between first side face 131a and third side face 131c. However, since second side face 131b is present between first side face 131a and third side face 131c of cam pin 131, it is difficult to continuously switch from the state in which first side face 131a slides on first side face 54a of first region 53a to the state in which third side face 131c slides on first side face 54a of second region 53b. For example, if the area of second side face 131b is large, the state in which cam pin 131 is not in contact with first side face 54a is generated from when first side face 131a is separated from first side face 54a of first region 53a till third side face 131c slides on first side face 54a of second region 53b. In other words, rattling can be caused on cam pin 131.

To address this problem, second side face 131b has a substantially triangular shape. Specifically, although second side face 131b is located between first side face 131a and third side face 131c, the upper end of second side face 131b forms a point on the upper end of cam pin 131 (that is, on a ridge formed by the side face and vertex surface 131g), so that the upper end of first side face 131a and the upper end of third side face 131c are substantially continuous. Accordingly, when being moved from first region 53a to second region 53b, cam pin 131 is continuously switched from the state in which the upper end of first side face 131a slides on first side face 54a of first region 53a to the state in which the upper end of third side face 131c slides on first side face 54a of second region 53b. According to this configuration, rattling of cam pin 131 can be suppressed.

While the status of cam pin 131 moving from first region 53a to second region 53b has been described above, the same is applied to the case where cam pin 131 moves from second region 53b to first region 53a.

<Prevention of Deformation of Cam Pin>

In addition, each cam pin 131 having the configuration described above is configured such that the ridge part on the rear in the optical axis direction is chamfered (so-called C chamfered). This configuration prevents an increase in sliding resistance of cam pins 131 when impact is applied to lens barrel 100.

More specifically, as illustrated in FIGS. 7, 8, and 10, the ridge part of each cam pin 131 formed by fifth side face 131e and vertex surface 131g is chamfered to form chamfered part 131i.

For example, when digital camera 1000 in the photographing position is dropped, there is a possibility that impact is applied to first unit 10, because first unit 10 is extended. The impact in this case is exerted in the direction of collapsing first unit 10, resulting in that great impact force is applied to the rear part of cam pin 131 in the optical axis direction and side faces of cam groove 53. Due to this impact force, cam pin 131 might be deformed. Particularly, stress caused by the impact received by lens barrel 100 is concentrated on the portion of cam pin 131 where the ridge part is formed, so that this portion is likely to be deformed radially outward. That is, the portion of cam pin 131 where the ridge part is formed is likely to be deformed to project toward the bottom of cam groove 53. If cam pin 131 is deformed, the sliding resistance between cam pin 131 and cam groove 53 might be increased.

To address this problem, lens barrel 100 is configured such that chamfered part 131i is formed on the ridge part formed by fifth side face 131e and vertex surface 131g in cam pin 131. This configuration enables an amount of deformation of cam pin 131, which would be caused by impact applied to lens barrel 100, to fall within the space between chamfered part 131i and cam groove 53. Consequently, the increase in the sliding resistance between cam pin 131 and cam groove 53 can be suppressed.

<Large-sized Cam Pins and Cam Grooves>

In lens barrel 100 thus configured, cam pins 131 and cam grooves 53 are formed to have a large size.

Specifically, lens barrel 100 has, on the inner circumferential side of first rear frame 13, a rectilinear mechanism, that is, rectilinear guides 25 and rectilinear grooves 132, which guides first unit 10 along the optical axis direction while restricting the rotation thereof. Specifically, rectilinear grooves 132 are formed on the inner circumferential surface of first rear frame 13, and rectilinear guides 25 extending from second unit 20 are disposed on the inner circumferential side of first rear frame 13.

In addition, a drive mechanism, that is, focusing motor 22 and drive gear 51, for rotationally driving drive frame 50 and a bayonet mechanism, that is, bayonet grooves 41 and bayonet claws 52, for allowing the rotation of drive frame 50 in the circumferential direction while restricting the linear movement thereof are provided on the outer circumferential side of drive frame 50. Specifically, drive gear 51 is provided on the outer circumferential surface of drive frame 50, and focusing motor 22 that is meshed with drive gear 51 through gear train 23 is disposed on the outer circumferential side of drive frame 50. In addition, bayonet claws 52 are formed on the outer circumferential surface of drive frame 50, and bayonet grooves 41 are formed on the inner circumferential surface of fixed frame 40.

According to this configuration, the number of components disposed on the outer circumferential surface of first rear frame 13 and the inner circumferential surface of drive frame 50 can be reduced as much as possible. In lens barrel 100 described above, only cam pins 131 are substantially provided on the outer circumferential surface of first rear frame 13, and only cam grooves 53 are formed on the inner circumferential surface of drive frame 50. Thus, in lens barrel 100, the sizes, particularly the circumferential sizes of cam grooves 53 can be increased, and the sizes, particularly the circumferential sizes of cam pins 131 can be increased. Since the sizes of cam pins 131 can be increased as described above, the strength of cam pins 131 can be improved. In addition, in lens barrel 100, the sizes of cam pins 131 and the sizes of cam grooves 53 engaged with cam pins 131 can be increased, whereby the strength in the engagement between cam pins 131 and cam grooves 53 can be improved.

Notably, as the rectilinear mechanism, a configuration has been known in which a rectilinear frame having a rectilinear groove formed thereon is provided on the inner circumferential side of a drive frame, and a cam pin penetrates the rectilinear groove on the rectilinear frame to be engaged with a cam groove on a drive frame. However, in this configuration, the number of frames is increased, by which the diameter of first rear frame 13 is undesirably decreased. When the diameter is decreased, the area of the outer circumference having the cam pins mounted thereon is also decreased, resulting in reduction in the sizes of cam pins 131. Specifically, due to the configuration in which the rectilinear mechanism is provided on the inner circumferential side of first rear frame 13 separately from cam pins 131 and cam grooves 53 as described above, the number of frames can be reduced to increase the diameter of first rear frame 13. According to this aspect, the sizes of cam pins 131 can also be increased.

<Biasing of First Unit>

Subsequently, biasing of first unit 10 in the optical axis direction will be described in detail.

First unit 10 is held by drive frame 50 through the engagement between cam pins 131 and cam grooves 53, so that rattling might be caused due to clearances between cam pins 131 and cam grooves 53. Further, since drive frame 50 is held by fixed frame 40 through the engagement between bayonet claws 52 and bayonet groove 41, rattling might be caused due to a clearance between bayonet claws 52 and bayonet groove 41.

On the other hand, in lens barrel 100, first unit 10 is biased toward the front side in the optical axis direction by biasing springs 24. With this configuration, cam pins 131 on first unit 10 are pressed against first side faces 54*a* of cam grooves 53, whereby rattling between first unit 10 and drive frame 50 can be suppressed. In addition, the biasing force applied from cam pins 131 to first side faces 54*a* of cam grooves 53 functions as biasing force for pressing bayonet claws 52 on drive frame 50 against the forward side face of bayonet groove 41 in the optical axis direction. According to this configuration, rattling of drive frame 50 and fixed frame 40 can be suppressed. In this way, the rattling of lens barrel 100 can be suppressed.

Figure 11:
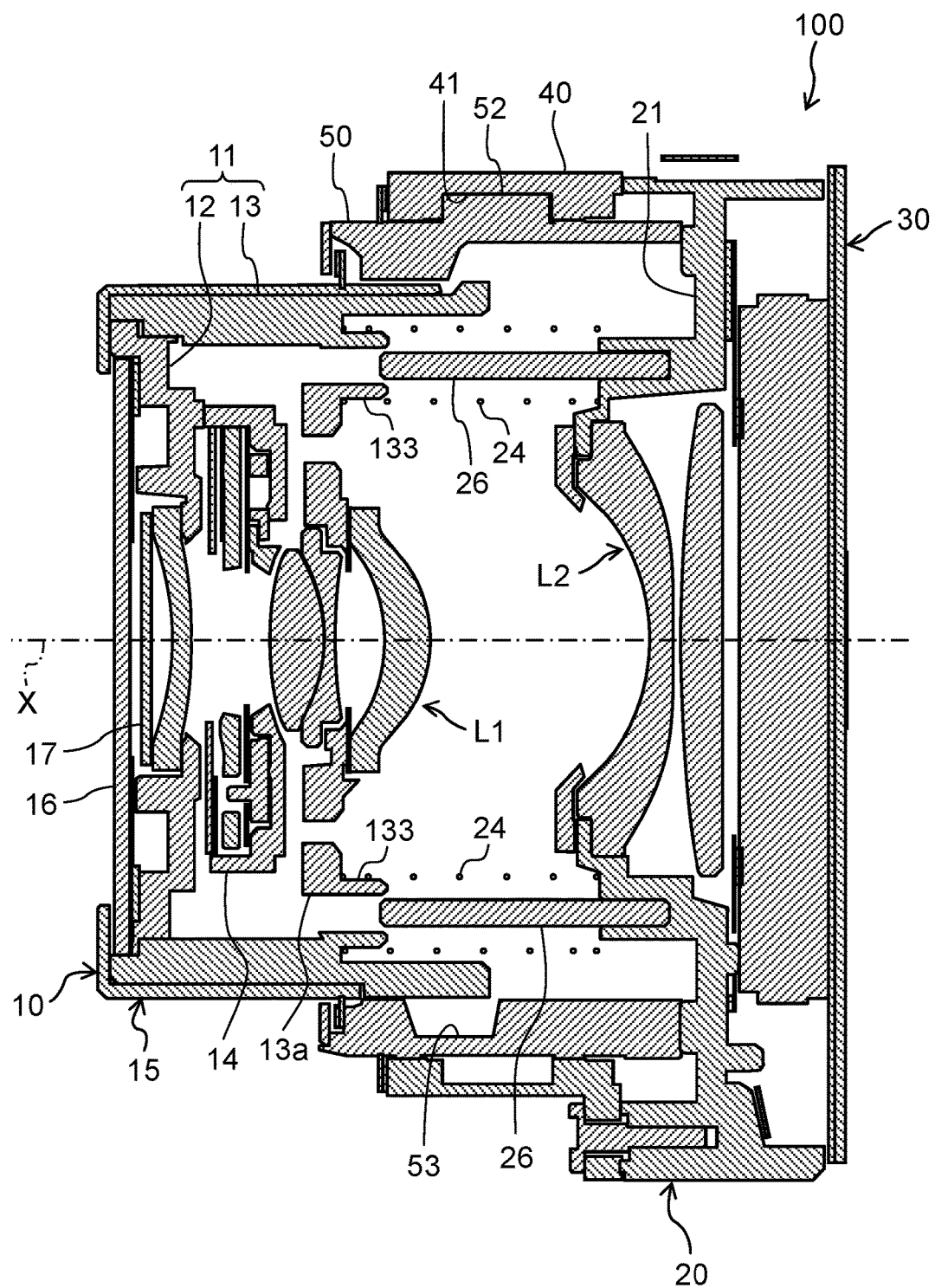
FIG. 11 is a sectional view of the lens barrel taken along line B-B in FIG. 6.

In the present embodiment, lens barrel 100 has a plurality of biasing springs 24 which is provided on the outer circumferential side of the lens units. FIG. 11 is a sectional view of lens barrel 100 taken along line B-B in FIG. 6.

For example, as a configuration for biasing a frame in the optical axis direction, there has been a configuration in which a coil spring having a diameter larger than that of a lens unit is provided to cover the lens unit. In this configuration, a space for arranging the coil spring needs to be ensured throughout the entire circumference of the lens unit.

On the other hand, biasing springs 24, which are coil springs, have diameters smaller than the effective diameter of the lens unit and are provided on two locations on the outer circumferential side of the lens unit. Specifically, second unit frame 21 of second unit 20 is provided with two spring guide shafts 26 extending forward in the optical axis direction. Two spring guide shafts 26 are provided on the outer circumferential side of second lens unit L2 so as to face each other across optical axis X. Each biasing spring 24 is inserted into each spring guide shaft 26. On the other hand, two bosses 133 are provided on holding section 13*a* of first rear frame 13. Two bosses 133 are provided on positions facing two spring guide shafts 26. In other words, the front ends of biasing springs 24 inserted into spring guide shafts 26 are fitted to bosses 133.

Due to the configuration in which a plurality of biasing springs 24 having smaller diameters is arranged on a plurality of locations on the outer circumferential side of the lens unit as described above, biasing springs 24 are located only on a portion of the outer circumference of the lens unit, not on the entire circumference thereof. Thus, the degree of freedom of arranging components on the outer circumference of the lens unit is increased, whereby a space can effectively be utilized. Consequently, lens barrel 100 can be downsized.

While lens barrel 100 in the present embodiment includes only two biasing springs 24, three or more biasing springs 24 may be provided. In addition, biasing springs 24 may not be provided on locations where they face each other across optical axis X in a strict sense. However, in the light of smooth movement of first unit 10 along the optical axis direction, two biasing springs 24 are preferably arranged to face each other across optical axis X. In addition, if three or more biasing springs 24 are provided, they are preferably provided so that biasing force on the front side in the optical axis direction is uniformly applied to first unit 10 about optical axis X.

<Shape of Second Lens Unit>

Figure 12:
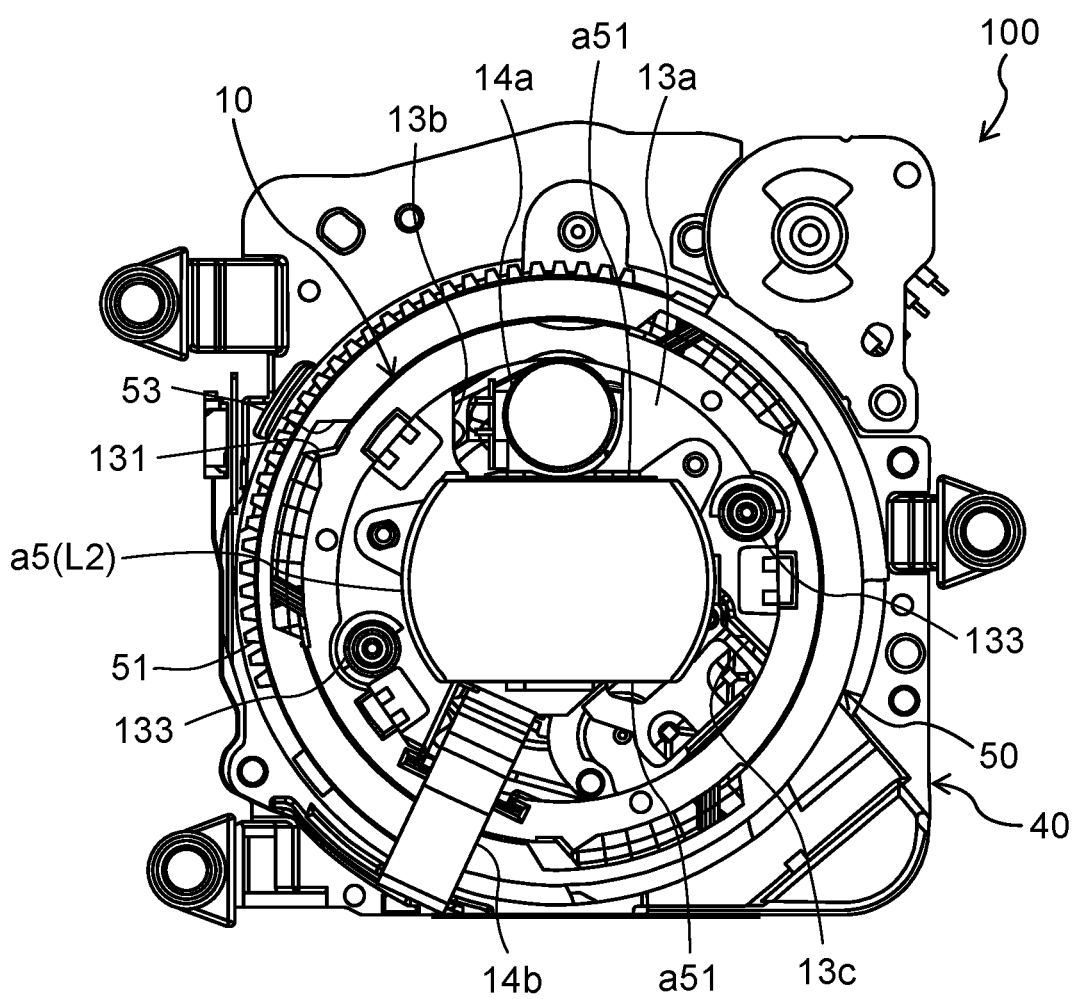
FIG. 12 is a back view of the lens barrel from which a second unit is removed.

Next, the shape of second lens unit L2 will be described in detail. FIG. 12 is a back view (viewed from the imaging element side) of lens barrel 100 from which second unit 20 is removed. FIG. 12 illustrates that fifth lens a5 in second lens unit L2 is overlapped. FIG. 13 is a sectional view of lens barrel 100 in the photographing position taken along line C-C in FIG. 6. FIG. 14 is a sectional view of lens barrel 100 in the retracted position taken along line C-C in FIG. 6.

Fifth lens a5 in second lens unit L2 has a shape in which a portion of a circle is cut in a plan view. Specifically, fifth lens a5 has a shape in which an outside portion of the effective diameter is cut along two chords a51 which are parallel to each other. In this way, spaces S1, S2 are formed outside of the cut portions in the radial direction by cutting a portion of fifth lens a5 as illustrated in FIG. 13. When lens barrel 100 is in the retracted position, motor 14*a* and flexible printed circuit board 14*b* of first unit 10 are respectively contained in spaces S1, S2 as illustrated in FIG. 14.

Specifically, in first unit 10, motor 14*a* projects rearward from holding section 13*a*. In the photographing position, first unit 10 moves forward, so that motor 14*a* and fifth lens a5 are separated from each other along the optical axis direction. On the other hand, in the retracted position, first unit 10 is close to second unit 20, so that the rear part of motor 14*a* is retracted to the position of fifth lens a5 along the optical axis direction. In the present embodiment, a portion of fifth lens a5 is cut to form space S1 on the outside of fifth lens a5 in the radial direction. The rear part of motor 14*a* is contained in space S1. In the retracted position, fifth lens a5 and motor 14*a* are arranged in the radial direction.

In addition, in first unit 10, flexible printed circuit board 14*b* is extended rearward from holding section 13*a*. Flexible printed circuit board 14*b* is extended to the rear end of drive frame 50 through the inner circumferential side of drive frame 50, and further extended to the outer circumferential surface of fixed frame 40 through the gap between the rear ends of drive frame 50 and fixed frame 40 and second unit frame 21. Because of the movement of first unit 10 along the optical axis direction, flexible printed circuit board 14*b* needs to have a length according to the movement of first unit 10, and further, in the retracted position, a space is needed which allows for a compact storage of flexible printed circuit board 14*b* being appropriately curved. In the present embodiment, a portion of fifth lens a5 is cut to form space S2 on the outside of fifth lens a5 in the radial direction. Flexible printed circuit board 14*b* is laid by utilizing space S2. Flexible printed circuit board 14*b* is extended rearward from first unit 10, and further extended to the outer circumferential surface of fixed frame 40 through space S2. In the retracted position, flexible printed circuit board 14*b* is curved and contained in space S2.

As described above, due to the configuration in which a portion of the lens in second unit 20 which does not move along the optical axis direction is cut, spaces for storing components in first lens unit 10 in the retracted position can be ensured. Consequently, first unit 10 can further be retracted to the rear in the retracted position, whereby lens barrel 100 in the retracted position can be downsized.

It should be noted that, in lens barrel 100, the components in first unit 10 to be contained in spaces S1, S2 are not limited to motor 14a and flexible printed circuit board 14b. Other components may be contained in spaces S1, S2. In addition, while fifth lens a5 is cut on two locations, it may be cut on one location or three or more locations. Furthermore, while only fifth lens a5 is cut in second lens unit L2, a lens other than fifth lens a5 in second lens unit L2 may be cut.

<Detailed Configuration of Front End Part of First Unit>

Subsequently, the configuration at the front-end part of first unit 10 will be described in detail.

As illustrated in FIGS. 7 and 8, in first unit 10, protection glass 16 is provided anterior to first lens a1 which is located closest to the subject side. Ring part 15b of decorative ring 15 is provided on the outer circumferential edge of the front surface of protection glass 16. Ring part 15b is a flat plate member of which normal line is oriented in the optical axis direction. Ring part 15b is formed into a torus, and the inner circumferential shape of ring part 15b is circular. Cylindrical part 15a of decorative ring 15 is fitted to the outer circumferential surface of first unit frame 11. Cylindrical part 15a extends to the rear part of first unit frame 11 from the front end thereof beyond the center in the optical axis direction. The rear end of cylindrical part 15a is located within drive frame 50 even when first unit 10 is most extended. That is, the entire portion of the outer circumferential surface of first unit frame 11 exposed from drive frame 50 is covered by cylindrical part 15a of decorative ring 15. Cylindrical part 15a and ring part 15b are integrally molded.

Protection glass 16 is a plate-shaped member having light transmission, and is substantially circular. Protection glass 16 is an example of a protection member. As illustrated in FIG. 6, annular light-shielding section 16a having opening 16b formed thereon is provided on protection glass 16. Light-shielding section 16a is formed by printing a coating material having light shielding property to at least light in a visible light range onto the rear surface of protection glass 16. Opening 16b on light-shielding section 16a is circular, and has an inner diameter larger than the effective diameter of first lens a1. That is, light-shielding section 16a shields light incident on the outside of effective surface (circle with the effective diameter) a11 of first lens a1, while not shielding light incident on effective surface a11 of first lens a1. In addition, the inner diameter of opening 16b on light-shielding section 16a is smaller than the inner diameter of ring part 15b. Specifically, the inner diameter of the opening of ring part 15b is smaller than the outer diameter of protection glass 16 and larger than the inner diameter of opening 16b on light-shielding section 16a. This configuration prevents ring part 15b from shielding light incident on effective surface a11 of first lens a1.

As illustrated in FIGS. 5 and 6, optical filter 17 has a substantially rectangular shape. The outer perimeter shape of optical filter 17 is larger than effective surface a11 of first lens a1. That is, all light incident on effective surface a11 of first lens a1 passes through optical filter 17, so that infrared light is cut. In addition, the outer perimeter shape of optical filter 17 is larger than the inner circumferential shape of opening 16b on light-shielding section 16a. That is, the inner circumferential shape of opening 16b on light-shielding section 16a is smaller than the outer perimeter shape of optical filter 17. Thus, the outer perimeter shape of optical filter 17 is not visible from the subject side.

In first unit 10 thus configured, protection glass 16 is provided closer to the subject side than first lens a1 which is located closest to the subject side in the imaging optical system. In the configuration in which protection glass 16 is provided on the most anterior part of first unit frame 11, protection glass 16 might be broken. To address such problem, ring part 15b is provided on the outer circumferential edge of the surface of protection glass 16 facing the subject side. In other words, ring part 15b is provided closer to the subject side than protection glass 16 and on the outer circumferential part which is particularly likely to be broken. According to this configuration, the outer circumferential edge of protection glass 16 is not exposed to the outside, whereby protection glass 16 can be prevented from being broken when digital camera 1000 is dropped.

Particularly, when digital camera 1000 is dropped with first unit 10, which is configured to be extended from fixed frame 40, being extended, protection glass 16 located on the front end of first unit 10 is susceptible to impact. The outer circumferential edge of protection glass 16 is particularly susceptible to impact. In view of this, ring part 15b is provided on the outer circumferential edge of the front surface of protection glass 16. Therefore, direct impact on the outer circumferential edge of protection glass 16 can be avoided.

As described above, lens barrel 100 includes: an imaging optical system comprising at least first lens a1; a plate-shaped protection glass 16 which is disposed closer to the subject side than first lens a1 and has light transmission; and annular ring part 15b provided on the outer circumferential edge of the surface of protection glass 16 facing the subject side.

According to this configuration, the outer circumferential edge, which is susceptible to impact when lens barrel 100 is dropped, of the surface of protection glass 16 facing the subject side can be protected by ring part 15b. Thus, direct impact on the outer circumferential edge of protection glass 16 can be reduced, whereby protection glass 16 can be prevented from being broken.

In addition, lens barrel 100 further includes first unit frame 11 that holds first lens a1, and fixed frame 40 that contains first unit frame 11, wherein first unit frame 11 is configured to be movable between a first position of being extended from fixed frame 40 and a second position of being collapsed in fixed frame 40.

According to this configuration, first unit frame 11 is configured to be extended from fixed frame 40. Therefore, when digital camera 1000 is dropped with first unit frame 11 being extended, protection glass 16 is susceptible to impact, and particularly, the outer circumferential edge thereof is susceptible to impact. In view of this, ring part 15b is provided on the outer circumferential edge of the surface of protection glass 16 facing the subject side. Therefore, direct impact on the outer circumferential edge of protection glass 16 can be avoided.

In addition, cylindrical part 15a covering the outer circumferential surface of first unit frame 11 on the end thereof on the subject side is provided integrally with ring part 15b.

According to this configuration, cylindrical part 15a is provided integrally with ring part 15b, and when cylindrical part 15a is fitted to the front end of first unit frame 11, ring part 15b can easily be disposed on the outer circumferential edge of protection glass 16. In addition, ring part 15b and cylindrical part 15a cover the region from the outer circumferential edge of protection glass 16 to the outer circumferential surface of first unit frame 11, whereby the design of first unit 10 on the front end thereof can be improved by decorative ring 15. Specifically, decorative ring 15 has not only the function of protecting protection glass 16 but also the function of improving the beauty of lens barrel 100.

In addition, lens barrel 100 further includes optical filter 17 provided between first lens a1 and protection glass 16.

Furthermore, protection glass 16 is provided with annular light-shielding section 16a having opening 16b larger than the effective surface of first lens a1, the outer perimeter shape of optical filter 17 is larger than the effective surface of first lens a1, and the inner circumferential shape of opening 16b on light-shielding section 16a is smaller than the outer perimeter shape of optical filter 17.

According to this configuration, light incident on the effective surface of first lens a1 all passes through optical filter 17. Optical filter 17 has the outer perimeter shape larger than the inner circumferential shape of opening 16b on light-shielding section 16a, while being located closer to the subject side than first lens a1. Therefore, the outer perimeter shape of optical filter 17 is not visible from the subject side. If being visible from the subject side, optical filter 17 affects the design of lens barrel 100. Specifically, the outer perimeter shape of optical filter 17 can be kept out of view by light-shielding section 16a. Thus, the beauty of lens barrel 100 can be improved.

In addition, the inner circumferential shape of ring part 15b is larger than opening 16b on light-shielding section 16a.

This configuration can prevent ring part 15b from shielding light entering from opening 16b on light-shielding section 16a in the configuration of covering the outer circumferential edge of protection glass 16 by ring part 15b. Furthermore, when lens barrel 100 is viewed from the subject side, the outer circumference of protection glass 16 is edged by ring part 15b, and light-shielding section 16a is annularly present on the portion of protection glass 16 on the inner side of ring part 15b. In other words, light-shielding section 16a surrounds opening 16b, and further, ring part 15b surrounds light-shielding section 16a. Thus, the design of lens barrel 100 as viewed from the subject side can be improved.

<<Other Exemplary Embodiments>>

As presented above, the exemplary embodiment has been described as an example of the technology according to the present disclosure. However, the technology in the present disclosure is not limited thereto, and may be also applied to other exemplary embodiments appropriately subjected to modifications, replacements, addition, or omissions. In addition, the constituent elements described in the exemplary embodiment can be combined to form a new embodiment. Moreover, constituent elements appearing in the accompanying drawings and the detailed description include not only those that are essential to solving the technical problems set forth herein, but also those that are not essential to solving the technical problems but are merely used to illustrate the technology disclosed herein. Therefore, those non-essential constituent elements should not immediately be taken as being essential for the reason that they appear in the accompanying drawings and/or in the detailed description.

The exemplary embodiment may be configured as described below.

While lens barrel 100 is built in digital camera 1000, the configuration is not limited thereto. Lens barrel 100 may be mounted to a video camera. In addition, lens barrel 100 may be mounted to smart devices including smartphones, camera-equipped mobile phone terminals, tablet terminals, and personal computers.

In addition, the lens configuration and the frame configuration in lens barrel 100 are only illustrative, and other configurations may be applied.

While optical filter 17 is provided between first lens a1 and protection glass 16, optical filter 17 may be provided on a different location or may be omitted. In addition, while optical filter 17 has the rectangular outer perimeter shape, it may have other shapes such as a circular shape.

While ring part 15b is formed integrally with cylindrical part 15a to constitute decorative ring 15, the configuration is not limited thereto. For example, ring part 15b may not have cylindrical part 15a formed therewith. In such a case, ring part 15b is attached on the outer circumferential edge of the surface of protection glass 16 facing the subject side.

In addition, ring part 15b may only be annular, and not limited to have a torus shape. In addition, the inner circumferential shape of ring part 15b is not limited to be circular.

Although lens barrel 100 employs protection glass 16 as an example of the protection member, it is not limited thereto. The protection member can be formed from any material, so long as it is a plate-shaped member having light transmission. The protection member may be formed from resin such as acrylic.

In addition, the relationship among the inner circumferential shape of ring part 15b, the inner circumferential shape of opening 16b on light-shielding section 16a, and the outer perimeter of optical filter 17 is only illustrative, and configurations other than that described above may be applied.

As described above, the technology disclosed herein can prevent the protection member from being broken, and is useful for a lens barrel and an imaging device.

What is claimed is:

1. A lens barrel comprising:
an optical system including at least one lens;
an optical filter disposed closer to a subject side than the optical system is;
a light-shielding section that is disposed closer to the subject side than the optical filter is, and has an opening which does not shield light and an annular section having light-shielding property to at least light in a visible light range; and
a plate-shaped protection member disposed closer to the subject side than the light-shielding section is and having light transmission,
wherein
an outer perimeter shape of the optical filter is larger than an inner perimeter shape of the opening on the light-shielding section and is smaller than an outer perimeter shape of the light-shielding section,
the lens barrel further comprises a ring part provided at an outer circumferential edge of the subject side of the plate-shaped protection member, and
the ring part covers the outer circumferential edge of the plate-shaped protection member.

2. The lens barrel according to claim 1, wherein the optical filter is substantially rectangular.

3. The lens barrel according to claim 2, wherein an outer perimeter shape of the protection member is equal to or larger than the outer perimeter shape of the light-shielding section.

4. The lens barrel according to claim 3, wherein the light-shielding section is formed by printing or applying a coating material on a surface of the protection member opposite to the subject side and the light-shielding section is provided integrally with the protection member.

5. The lens barrel according to claim 4, wherein
a part of a surface closer to the subject side of the protection member is exposed to an outside of the lens barrel.

6. An imaging device comprising:
the lens barrel according to claim 1; and
a camera main body.

7. The lens barrel according to claim 1, wherein
the lens barrel has a first unit frame holding a first lens of the optical system and a fixed frame containing the first unit frame, and
the first unit frame is configured to be movable between a first position of being extended from the fixed frame and a second position of being collapsed in the fixed frame.

8. The lens barrel according to claim 7, wherein
the lens barrel further comprises a cylindrical part covering the outer circumferential surface on an end on the subject side of the first unit frame, and
the cylindrical part is provided integrally with the ring part.

9. The lens barrel according to claim 1, wherein
an inner diameter of an opening of the ring part is smaller than an outer diameter of the protection member.

10. The lens barrel according to claim 9, wherein
an inner diameter of the opening of the shielding section is smaller than an inner diameter of the ring portion.

\* \* \* \* \*